US006751631B2

(12) United States Patent
Hrebejk et al.

(10) Patent No.: US 6,751,631 B2
(45) Date of Patent: *Jun. 15, 2004

(54) METHOD FOR META OBJECT FACILITY REPOSITORY BOOTSTRAP

(75) Inventors: Petr Hrebejk, Usti nad Labem (CZ); Martin Matula, Prague (CZ); Pavel Buzek, Divisov (CZ)

(73) Assignee: Sun Microsystems, Inc., Santa Clara, CA (US)

(*) Notice: Subject to any disclaimer, the term of this patent is extended or adjusted under 35 U.S.C. 154(b) by 518 days.

This patent is subject to a terminal disclaimer.

(21) Appl. No.: 09/847,770

(22) Filed: May 1, 2001

(65) Prior Publication Data

US 2002/0165866 A1 Nov. 7, 2002

(51) Int. Cl.[7] ............................. G06F 17/00; G06F 7/00
(52) U.S. Cl. ....................................................... 707/103
(58) Field of Search .......................... 707/1, 10, 100, 707/101, 103; 713/2

(56) References Cited

U.S. PATENT DOCUMENTS

| | | | | |
|---|---|---|---|---|
| 5,355,472 A | 10/1994 | Lewis | | 707/101 |
| 5,721,925 A | 2/1998 | Cheng et al. | | 709/315 |
| 5,758,348 A | 5/1998 | Neubauer | | 707/103 |
| 5,889,992 A | 3/1999 | Koerber | | 717/108 |
| 5,905,987 A | 5/1999 | Shutt et al. | | 707/103 |
| 6,003,039 A | 12/1999 | Barry et al. | | 707/103 |
| 6,154,747 A | 11/2000 | Hunt | | 707/100 |
| 6,199,195 B1 | * 3/2001 | Goodwin et al. | | 717/104 |
| 6,292,932 B1 | * 9/2001 | Baisley et al. | | 717/114 |
| 6,381,743 B1 | * 4/2002 | Mutschler, III | | 717/104 |
| 6,415,299 B1 | * 7/2002 | Baisley et al. | | 707/203 |

OTHER PUBLICATIONS

Iyenger, Sridhar, "A Universal Respository Architecture using the OMG UML and MOF", Enterprise Distributed Object Computing Workshop, 1998. EDOC 1998 Proceedings. Second International.*
Bezivin J and Lemesle R, "Towards a true Reflective Modeling Scheme", Springer–Verlag, 2000.*
Bodsky, et al, "Common Application Metamodel including C/C++ Metamodel", Pub. No.: US 2002/0046294 A1, Apr. 18, 2002.*

* cited by examiner

Primary Examiner—Greta Robinson
Assistant Examiner—Susan Rayyan
(74) Attorney, Agent, or Firm—Thelen Reid & Priest LLP; John P. Schaub

(57) ABSTRACT

A method for loading a model of Meta Object Facility (MOF) includes creating a first MOF instance including a model of MOF that is based upon a stored definition of MOF, rebuilding the first MOF instance to make it a metamodel of itself, instantiating the first MOF instance to create a second MOF instance, loading the stored definition of MOF into the second MOF instance and rebuilding the second MOF instance to make the second MOF instance a metamodel of the second MOF instance.

14 Claims, 10 Drawing Sheets

| Level | Description | Example |
|---|---|---|
| M3 Meta-Metamodel | Defines Language for Specifications of Metamodels | MetaClass, MetaAttribute, MetaOperation |
| M2 Metamodel | Instance of Meta-Metamodel Defines Language for Describing Specifications of Models | Class, Attribute, Operation, Component |
| M1 Model | Instance of Meta-Metamodel Defines Language for Describing Information Domains | Point, x Co-ordinate, y Co-ordinate, Move (int dx, int dy) |
| M0 User Objects | Instance of Model | Point [x=100; y=20] |

FIG. 1B
(Prior Art)

METHOD FOR META OBJECT FACILITY REPOSITORY BOOTSTRAP

CROSS REFERENCE TO RELATED APPLICATIONS

This application is related to the following: U.S. patent application Ser. No. US2002/0165786A1, filed May 1, 2001 in the name of inventors Petr Hrebejk, Martin Matula and Pavel Buzek, entitled "Method for Dynamic Implementation of Java™ Metadata Interfaces", commonly assigned herewith.

FIELD OF THE INVENTION

The present invention relates to the field of computer science. More particularly, the present invention relates to a method for Meta Object Facility (MOF) repository bootstrap.

BACKGROUND OF THE INVENTION

Today's Internet-driven economy has accelerated users' expectations for unfettered access to information resources and transparent data exchange among applications. One of the key issues limiting data interoperability today is that of incompatible metadata. Metadata is information about other data, or simply data about data. Metadata is typically used by tools, databases, applications and other information processes to define the structure and meaning of data objects.

Unfortunately, most applications are designed with proprietary schemes for modeling metadata. Applications that define data using different semantics, structures and syntax are difficult to integrate, impeding the free flow of information access across application boundaries. This lack of metadata interoperability hampers the development and efficient deployment of numerous business solutions. These solutions include data warehousing, business intelligence, business-to-business exchanges, enterprise information portals and software development.

An improvement is made possible by establishing standards based upon XML Document Type Definitions (DTDs). However, DTDs lack the capability to represent complex, semantically rich, hierarchical metadata.

A further improvement is made possible by the Meta Object Facility (MOF) specification. MOF is described in a text entitled "Meta Object Facility (MOF) Specification", Object Management Group, Inc., version 1.3, March 2000. The MOF specification defines a standard for metadata management. The goal of MOF is to provide a framework and services to enable model and metadata driven systems. The MOF is a layered metadata architecture consisting of a single meta-metamodel (M3), metamodels (M2) and models (M1) of information. Each meta level is an abstraction of the meta level below it. These levels of abstraction are relative, and provide a visual reference of MOF based frameworks. Metamodeling is typically described using a four-layer architecture. These layers represent different levels of data and metadata. Layers M1, M2 and M3 are depicted in FIG. 1A. FIG. 1B includes a summary and example of each layer.

The information layer (also known as the M0 or data layer) refers to actual instances of information. These are not shown in FIG. 1A, but examples of this layer include instances of a particular database, application data objects, etc.

The model layer 100 (also known as the M1 or metadata layer) defines the information layer. The model layer 100 describes the format and semantics of the data. The metadata specifies, for example, a table definition in a database schema that describes the format of the M0 level instances. A complete database schema combines many metadata definitions to construct a database model. The M1 layer 100 represents instances (or realizations) of one or more metamodels.

The metamodel layer 105 (also known as the M2 or meta-metadata layer) defines the model layer. The metamodel layer 105 describes the structure and semantics of the metadata. The metamodel specifies, for example, a database system table that describes the format of a table definition. A metamodel can also be thought of as a modeling language for describing different kinds of data. The M2 layer represents abstractions of software systems modeled using the MOF Model. Typically, metamodels describe technologies such as relational databases, vertical domains, etc.

The meta-metamodel (M3) layer 110 defines the metamodel layer. The meta-metamodel layer 110 describes the structure and semantics of the meta-metadata. It is the common "language" that describes all other models of information. Typically, the meta-metamodel is defined by the system that supports the metamodeling environment. In the case of relational databases, the meta-metamodel is hard-wired by the SQL standard.

In addition to the information-modeling infrastructure, the MOF specification defines an Interface Definition Language (IDL) mapping for manipulating metadata. More specifically, for any given MOF compliant metamodel, the IDL mapping generates a set of Application Program Interfaces (APIs) that provide a common IDL programming model for manipulating the information contained in any instance of that metamodel. The MOF model itself is a MOF compliant model. Therefore, the MOF model can be described using the MOF. Consequently, APIs used to manipulate instances of the MOF Model (i.e., metamodels) conform to the MOF to IDL mapping.

Other mappings may be used to manipulate metadata. The mappings define how to generate a set of APIs that provide a common programming model for manipulating metadata of any MOF compliant model. Using the mappings, applications and tools that specify their interfaces to the models using MOF-compliant Unified Modeling Language (UML) can have the interfaces to the models automatically generated. Using this generated set of APIs, applications can access (create, delete, update and retrieve) information contained in a MOF compliant model.

The MOF also defines a set of reflexive APIs. Similar to Java™ reflection, MOF reflection provides introspection for manipulating complex information. The MOF reflexive interfaces allow a program to discover and manipulate information without using the tailored APIs rendered using the MOF to IDL mapping (or the mapping of MOF to another programming language).

Metamodel and metadata interchange via XML is enabled by XML Metadata Interchange (XMI) specification, an XML-based mechanism for interchanging metamodel information among applications. The XML Metadata Interchange (XMI) standard provides a mapping from MOF to XML. That is, information that has been modeled in MOF can be rendered in XML DTDs and XML documents using the XMI mapping.

Object repositories typically include methods for adding, updating and reading object information maintained in the repository. A MOF repository is more flexible. Initially, a MOF repository includes methods for manipulating MOF objects. An implementor of a MOF repository typically hard-codes the implementation of these methods. Once this is done, a user may create MOF objects and the MOF repository can create methods to manipulate objects of the metamodel that is described by the MOF objects. However, a change to the model of MOF typically requires reimplementing the methods for manipulating MOF objects. This is described in more detail below with reference to FIG. 2.

Turning now to FIG. 2, a typical method for implementing a MOF repository is illustrated. At 200, the developer of a MOF repository hard-codes the implementation of methods for accessing MOF objects. This is required in order for users to create metamodels. At 205, the repository user creates objects describing or modeling a language. At 210, the repository user indicates that the classes added at reference numeral 205 describe a particular metamodel. At 215, the metamodel is instantiated, creating a new "repository context" or instance of the metamodel. Instantiating a metamodel creates helper objects or proxies for each package, association and class in the model. These proxies may be used to create instances of metamodel elements until the model of MOF changes.

At some point, a new version of the MOF model is promulgated. At 220, a determination is made regarding whether the model of MOF has changed. When the model of MOF changes, a repository developer may continue using the old MOF version or the repository developer may decide to use the new MOF version. If the repository developer decides to use the new MOF version, at 225, the repository implementation must be rewritten to comply with the new MOF version.

Reimplementing an entire MOF repository when the model of MOF changes requires significant coding efforts. What is needed is a solution that reduces the amount of coding required when the model of MOF changes.

BRIEF DESCRIPTION OF THE INVENTION

A method for loading a model of Meta Object Facility (MOF) includes creating a first MOF instance including a model of MOF that is based upon a stored definition of MOF, rebuilding the first MOF instance to make it a metamodel of itself, instantiating the first MOF instance to create a second MOF instance, loading the stored definition of MOF into the second MOF instance and rebuilding the second MOF instance to make the second MOF instance a metamodel of the second MOF instance. An apparatus for loading a model of Meta Object Facility (MOF) includes a boot loader to create a first MOF instance including a model of MOF that is based upon a stored definition of MOF, a rebuilder to rebuild a MOF instance to make it a metamodel of itself, an instantiator to instantiate the first MOF instance to create a second MOF instance and a loader to load the stored definition of MOF into the second MOF instance. The instantiator is further configured to dynamically implement interfaces.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1B is a table that illustrates examples of the layers depicted in FIG. 1A.

DETAILED DESCRIPTION OF A PREFERRED EMBODIMENT

Embodiments of the present invention are described herein in the context of method for meta object facility repository bootstrap. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will readily recognize that devices of a less general purpose nature, such as hard-wired devices, devices relying on FPGA (field programmable gate array) or ASIC (Application Specific Integrated Circuit) technology, or the like, may also be used without departing from the scope and spirit of the inventive concepts disclosed herein.

Figure 1A:
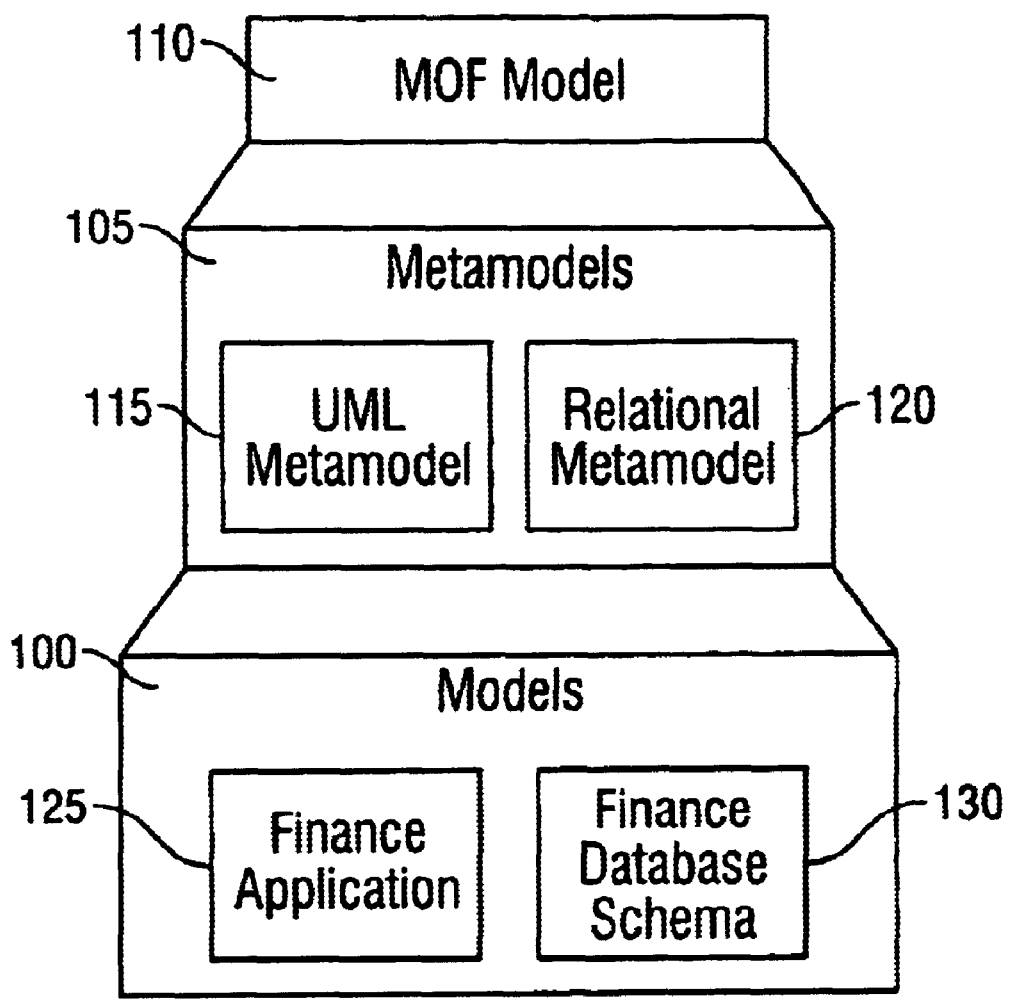
FIG. 1A is a block diagram that illustrates a four-layer architecture used to describe metamodeling.
Figure 2:
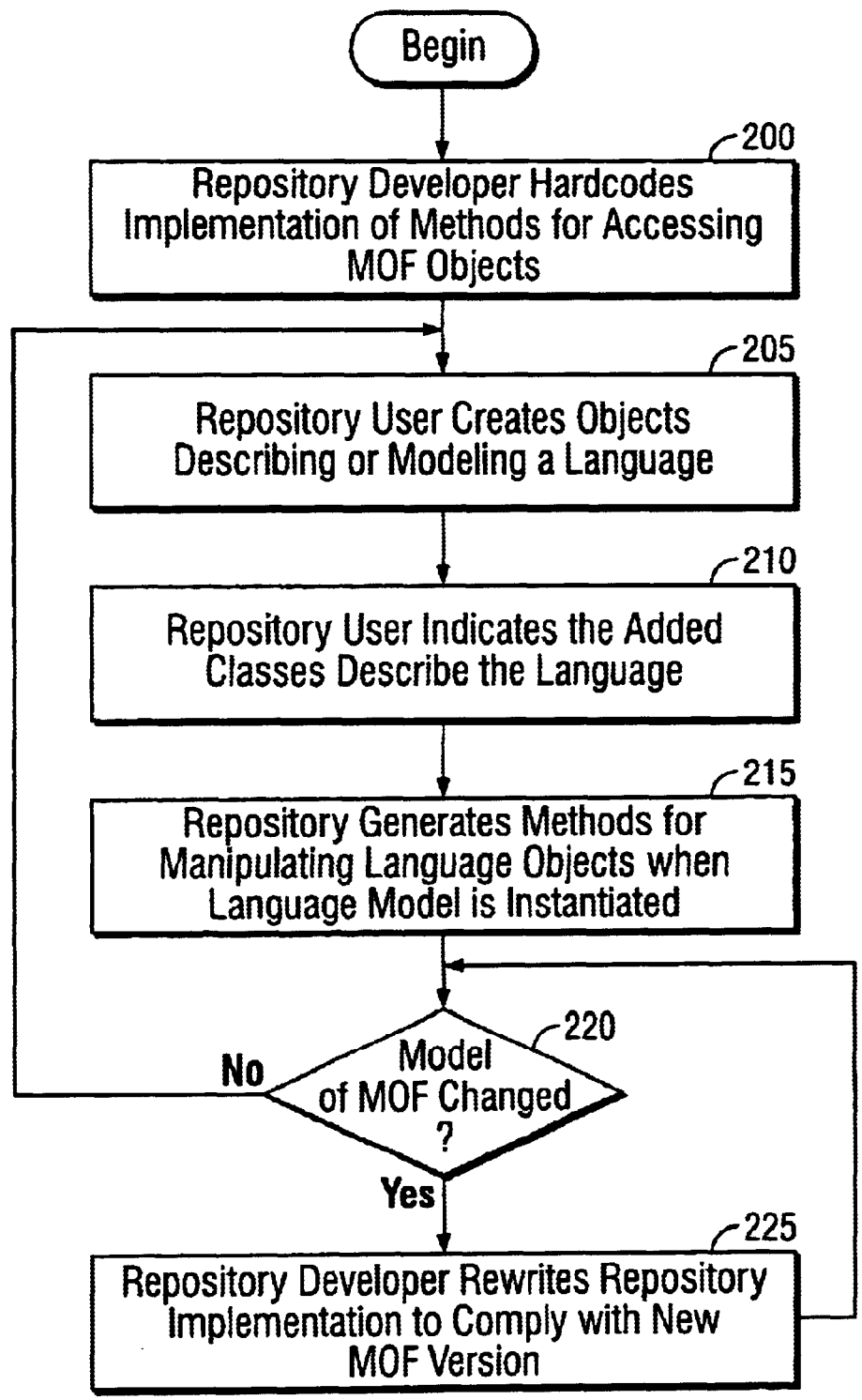
FIG. 2 is a flow diagram that illustrates a method for implementing a repository.
Figure 3:
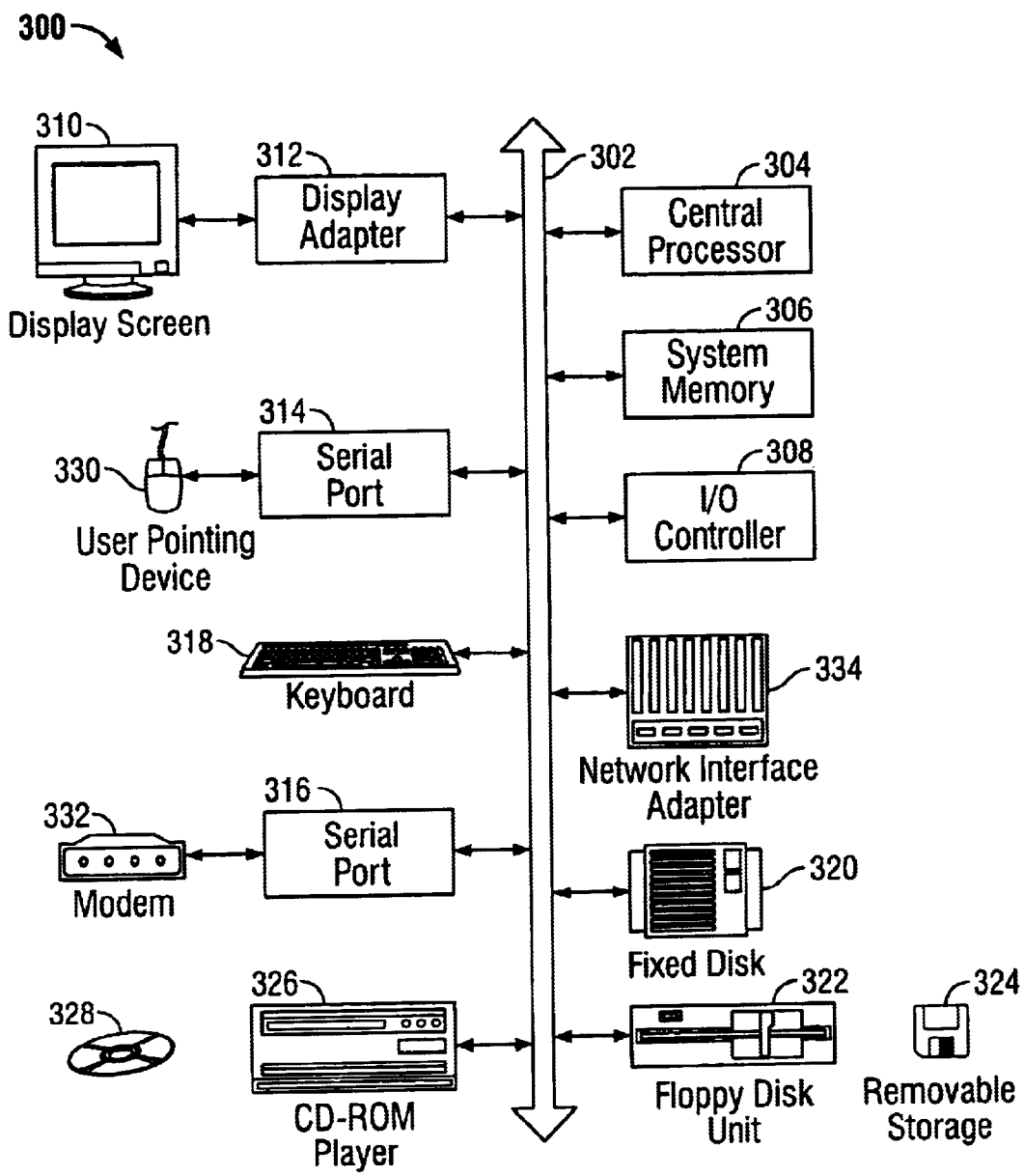
FIG. 3 is a block diagram of a client computer system suitable for implementing aspects of the present invention.

FIG. 3 depicts a block diagram of a computer system 300 suitable for implementing aspects of the present invention. As shown in FIG. 3, computer system 300 includes a bus 302 which interconnects major subsystems such as a central processor 304, a system memory 306 (typically RAM), an input/output (I/O) controller 308, an external device such as a display screen 310 via display adapter 312, serial ports 314 and 316, a keyboard 318, a fixed disk drive 320, a floppy disk drive 322 operative to receive a floppy disk 324, and a CD-ROM player 326 operative to receive a CD-ROM 328. Many other devices can be connected, such as a pointing device 330 (e.g., a mouse) connected via serial port 314 and a modem 332 connected via serial port 316. Modem 332 may provide a direct connection to a remote server via a telephone link or to the Internet via a POP (point of presence). Alternatively, a network interface adapter 334 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 3 to be present to practice the present invention, as discussed below. Furthermore, the devices and subsystems may be interconnected in different ways from that shown in FIG. 3. The operation of a computer system such as that shown in FIG. 3 is readily known in the art and is not discussed in detail in this application, so as not to overcomplicate the present discussion. Code to implement the present invention may be operably disposed in system memory 306 or stored on storage media such as fixed disk 320, floppy disk 324 or CD-ROM 326.

According to embodiments of the present invention, a modified boot sequence is used to load a model of MOF. Only a relatively small part of MOF is hard-coded while the remaining methods for accessing MOF objects are dynamically generated, thus significantly reducing the amount of re-coding required when the model of MOF changes.

Figure 4:
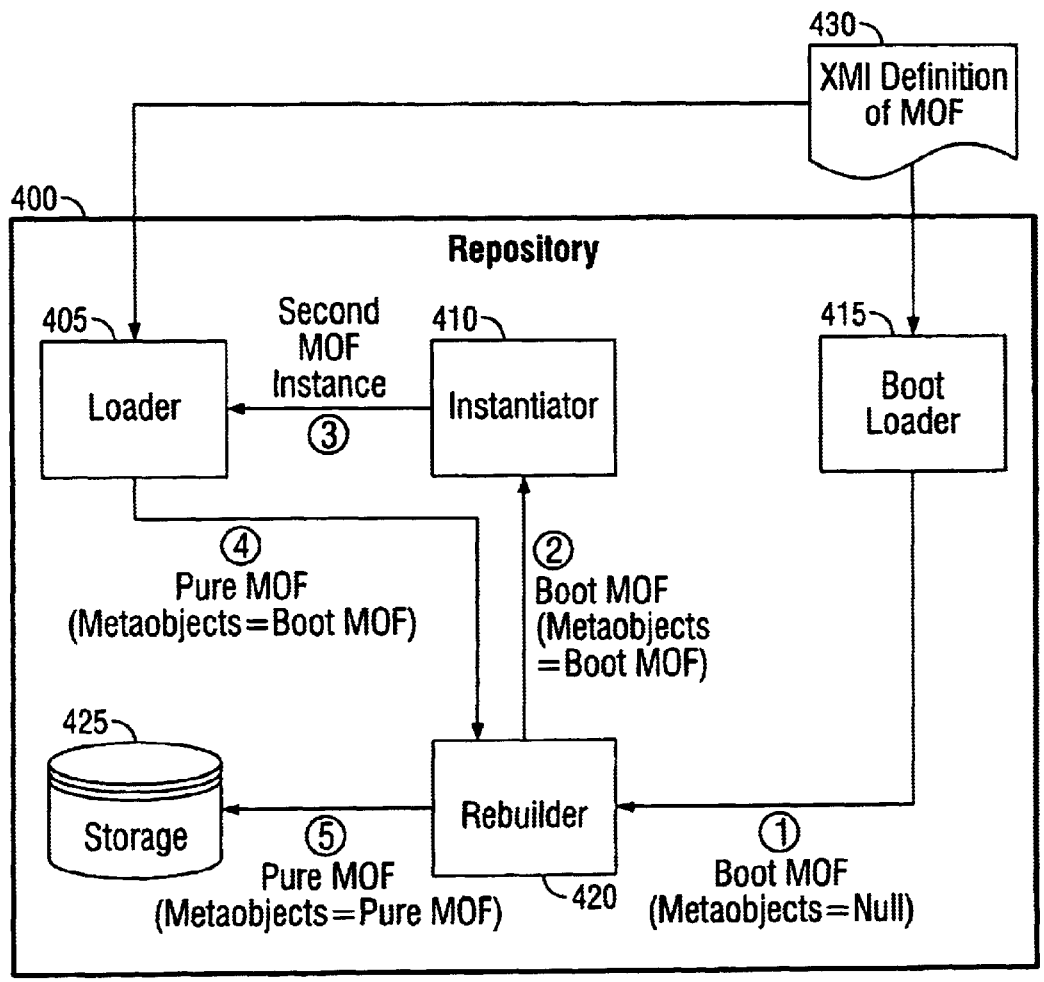
FIG. 4 is a block diagram that illustrates an apparatus for loading a model of MOF in accordance with one embodiment of the present invention.

Turning now to FIG. 4, a block diagram that illustrates an apparatus for loading a model of MOF in accordance with one embodiment of the present invention is presented. Repository 400 includes a loader 405, an instantiator 410, a boot loader 415, a rebuilder 420 and storage 425. In operation, boot loader 415 receives an XMI definition of MOF 430 and creates a first MOF instance (also called "Boot MOF") that contains a model of MOF. Boot loader 415 makes a first pass thru the XMI definition of MOF to create proxies for each MOF class, package and association. Boot loader 415 makes a second pass thru the XMI definition of MOF to read the MOF model into the first instance of MOF. At this point, each object in the first instance of MOF returns the value "null" for its metaobject.

Still referring to FIG. 4, rebuilder 420 receives the first MOF instance and rebuilds it to make the first MOF instance a metamodel of itself. In more detail, the metaobject for each object in the first MOF instance is set to the corresponding object in the first MOF instance. Instantiator 410 receives the rebuilt first MOF instance and creates a second MOF instance (also called "Pure MOF") from the first MOF instance. Loader 405 receives the second MOF instance and loads an XMI definition of MOF into the second MOF instance. At this point, the second MOF instance includes metaobjects from the first instance. Rebuilder 420 receives the second MOF instance and rebuilds it to make the second MOF instance a metamodel of itself. The second MOF instance is stored in storage 425 and the first MOF instance is deleted.

Figure 5:
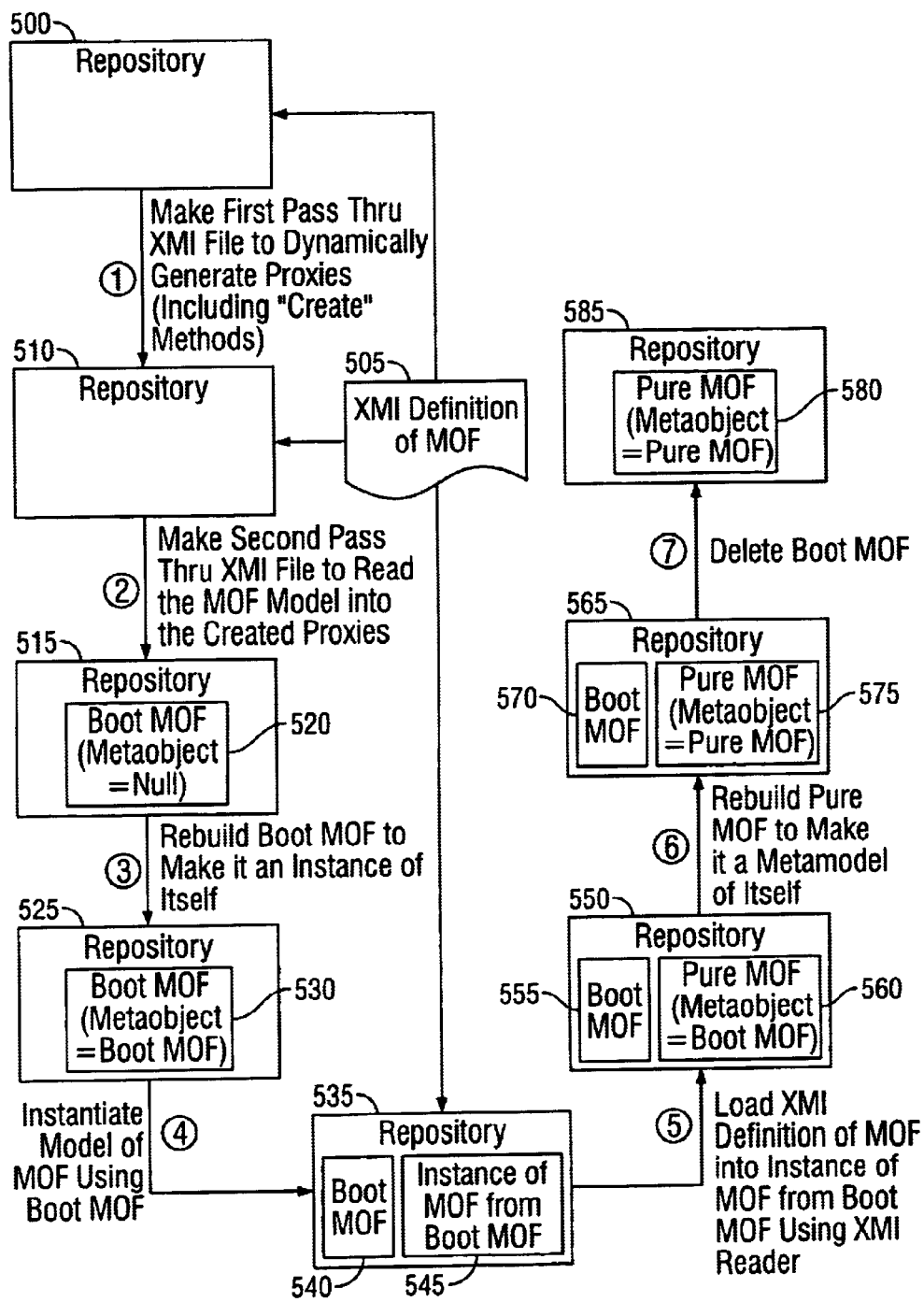
FIG. 5 is a block diagram that illustrates a method for loading a model of MOF in accordance with one embodiment of the present invention.

Turning now to FIG. 5, a block diagram that illustrates loading a model of MOF in accordance with one embodiment of the present invention is presented. FIG. 5 shows the contents of a repository during various stages of the process. The repository 500 is initially empty. A first pass is made thru a file 505 containing an XMI definition of MOF to dynamically generate proxies for each MOF class, package and association. A second pass is made thru the XMI file 505 to read the MOF model into the created proxies, creating a first MOF instance that contains a model of MOF. At this point, the repository 515 includes a first MOF instance 520 (also called "Boot MOF") that contains a model of MOF based upon the XMI definition of MOF. The first MOF instance 520 is rebuilt to make it an instance of itself. After the first MOF instance 520 is rebuilt, the repository 525 includes a first MOF instance 530 that contains a model of MOF based upon the XMI definition of MOF and the model is a metamodel of itself.

Still referring to FIG. 5, after the first MOF instance 530 is rebuilt, a second MOF instance is created from the first MOF instance 530. In more detail, the first MOF instance 530 is instantiated to create a second MOF instance. At this point, the repository 535 contains boot MOF 540 and a second MOF instance 545 that contains a model of MOF based upon the boot MOF. After the second MOF instance is 545 created, the XMI definition of MOF 505 is loaded into the second MOF instance 545. At this point, the repository 550 contains boot MOF 555 and a second MOF instance 560 that contains the complete model of MOF. However, objects in the second MOF instance 560 return objects from boot MOF as their metaobjects. Thus, the second MOF instance 560 is rebuilt to make the second MOF instance 560 an instance of itself. After the second MOF instance 560 is rebuilt, the repository 565 contains boot MOF 570 and a second MOF instance 575 that contains the complete model of MOF and that is a metamodel of itself. The second MOF instance 575 is stored in the repository 565 and the first MOF instance 570 is deleted, leaving only the complete model of MOF 580 in the repository 585. New metamodels may be created by creating a new instance of Pure MOF and then creating metamodel elements using the proxies generated as a result of the instantiation.

Embodiments of the present invention utilize two separate MOF instances because the boot loader does not need to load the entire MOF model. For example, instances of the "Tag" class may be ignored when reading the MOF model into the created proxies (step 2 of FIG. 5). Thus, after creating boot MOF, instantiator (reference numeral 410 of FIG. 4) is used to create a second MOF instance that is based upon boot MOF and the XMI definition of MOF is loaded into the second MOF instance. This ensures that the second MOF instance includes a complete model of MOF because instantiator (reference numeral 410 of FIG. 4) and loader (reference numeral 405 of FIG. 4) are the same full featured classes used to instantiate or load any other metamodel.

Figure 6:
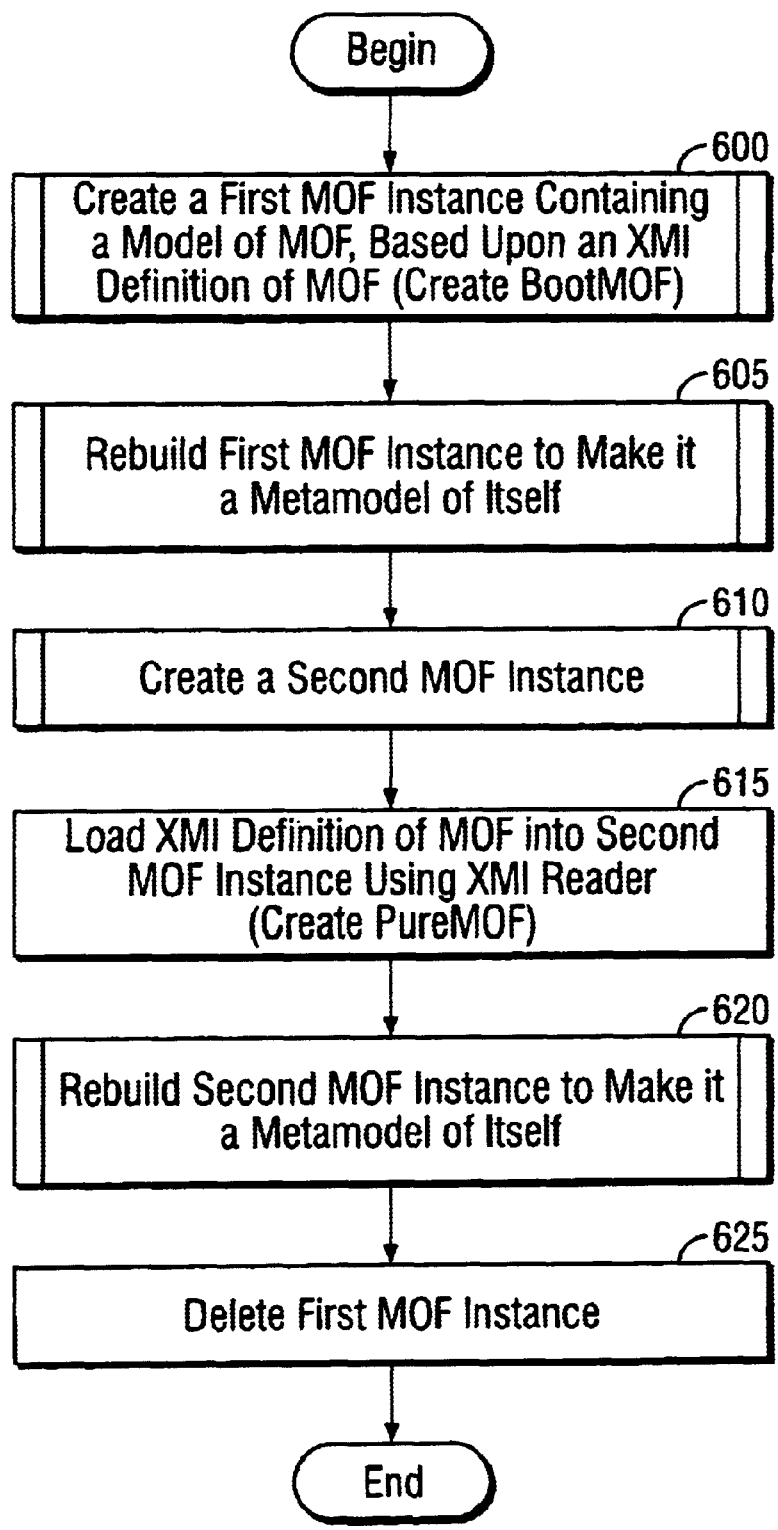
FIG. 6 is a flow diagram that illustrates a method for loading a model of MOF in accordance with one embodiment of the present invention.

Turning now to FIG. 6, a flow diagram that illustrates a method for loading a model of MOF in accordance with one embodiment of the present invention is presented. At 600, a first MOF instance (also called "Boot MOF") is created. The first MOF instance contains a model of MOF that is based upon an XMI definition of MOF. At 605, the first MOF instance is rebuilt to make it a metamodel of itself. At 610, a second MOF instance (also called "Pure MOF") is created. The second MOF instance is an instantiation of the first MOF instance. At 615, the XMI definition of MOF is loaded into the second MOF instance. At 620, the second MOF instance is rebuilt to make it a metamodel of itself. At 625, the first MOF instance is deleted from the repository. New metamodels may be created by creating a new instance of Pure MOF and then creating metamodel elements using the proxies generated as a result of the instantiation.

Figure 7:
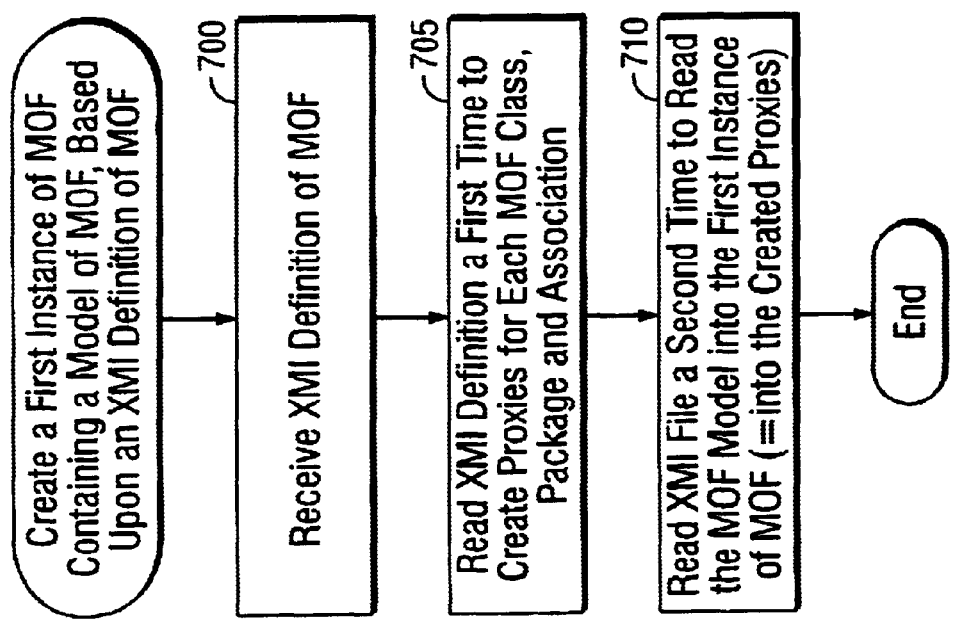
FIG. 7 is a flow diagram that illustrates a method for creating a first instance of MOF containing a model of MOF that is based upon an XMI definition of MOF in accordance with one embodiment of the present invention.

Turning now to FIG. 7, a flow diagram that illustrates a method for creating a first instance of MOF containing a model of MOF that is based upon an XMI definition of MOF in accordance with one embodiment of the present invention is presented. FIG. 7 provides more detail for reference numeral 600 of FIG. 6. At 700, an XMI definition of MOF is received. At 705, the XMI definition is read a first time to create proxies for each MOF class, package and association. At 710, the XMI file is read a second time to read the MOF model into the first instance of MOF. In more detail, the MOF model is read into the proxies created at reference numeral 705.

Figure 8:
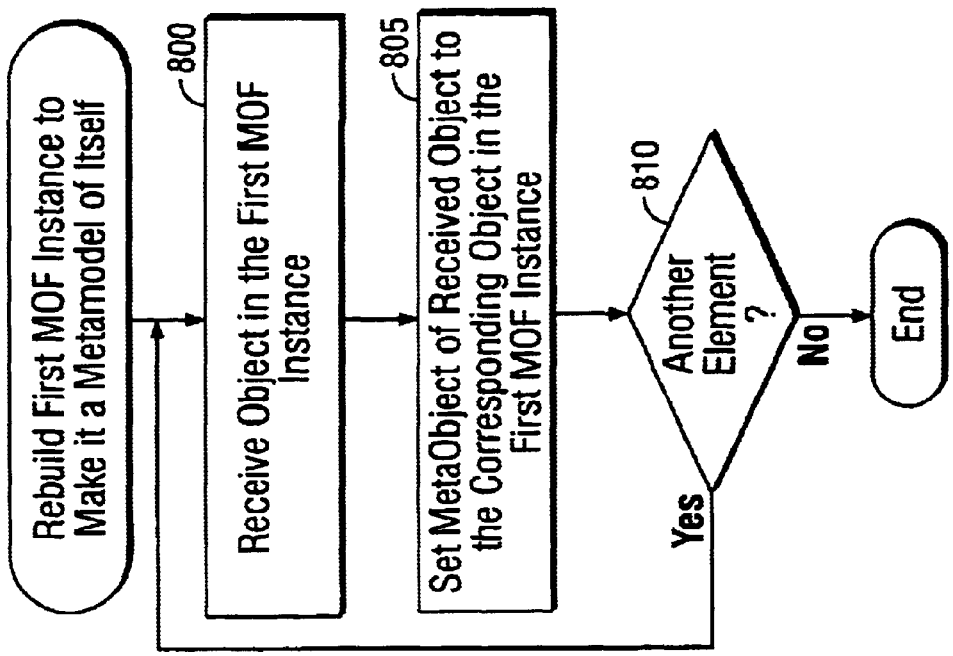
FIG. 8 is a flow diagram that illustrates a method for rebuilding a first MOF instance to make it a metamodel of itself in accordance with one embodiment of the present invention.

Turning now to FIG. 8, a flow diagram that illustrates a method for rebuilding a first MOF instance to make it a metamodel of itself in accordance with one embodiment of the present invention is presented. FIG. 8 provides more detail for reference numeral 605 of FIG. 6. At 800, an object from the first MOF instance is received. At 805, the metaobject of the received object is set to the corresponding object in the first MOF instance. At 810, a determination is made regarding whether another element remains. If another element remains, processing continues at 800.

Figure 9:
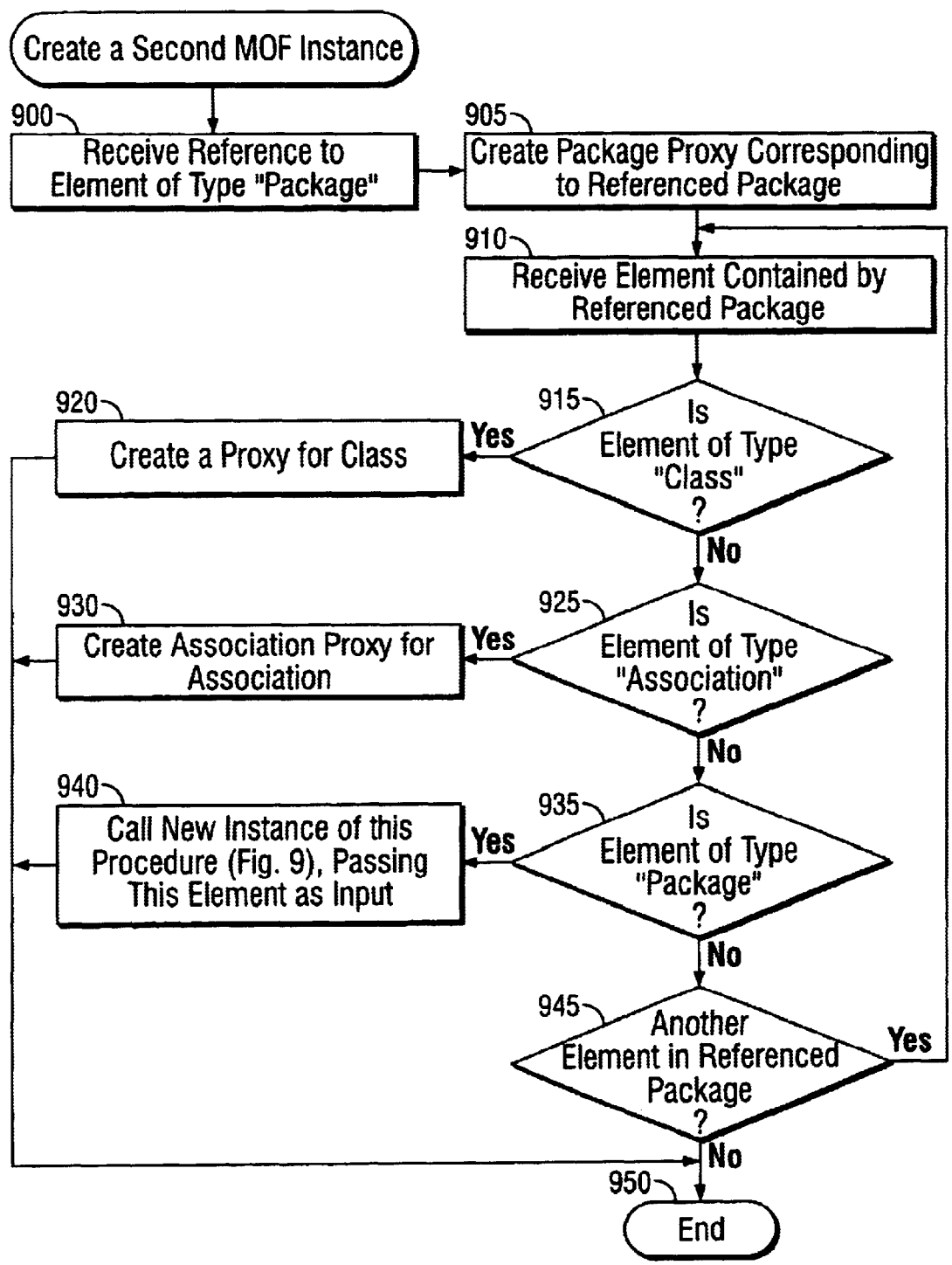
FIG. 9 is a flow diagram that illustrates a method for creating a second MOF instance in accordance with one embodiment of the present invention.

Turning now to FIG. 9, a flow diagram that illustrates a method for creating a second MOF instance in accordance with one embodiment of the present invention is presented. FIG. 9 provides more detail for reference numeral 610 of FIG. 6. At 900, a reference to an element of type "Package" is received. At 905, a package proxy corresponding to the referenced package is created. At 910, an element contained by the referenced package is received. At 915, a determination is made regarding whether the received element is of type "Class". If the received element is of type "Class", a proxy is created for the class at 920. At 925, a determination is made regarding whether the received element is of type "Association". If the received element is of type "Association", an association proxy is created for the association at 930. At 935, a determination is made regarding whether the received element is of type "Package". If the received element is of type "Package", a new instance of the procedure illustrated by FIG. 9 is called and the received element is input to the new instance. At 945, a determination is made regarding whether another element in the referenced package remains to be processed. If there is another element, it is processed beginning at reference numeral 910. If there are no more elements, processing ends at 950.

Figure 10:
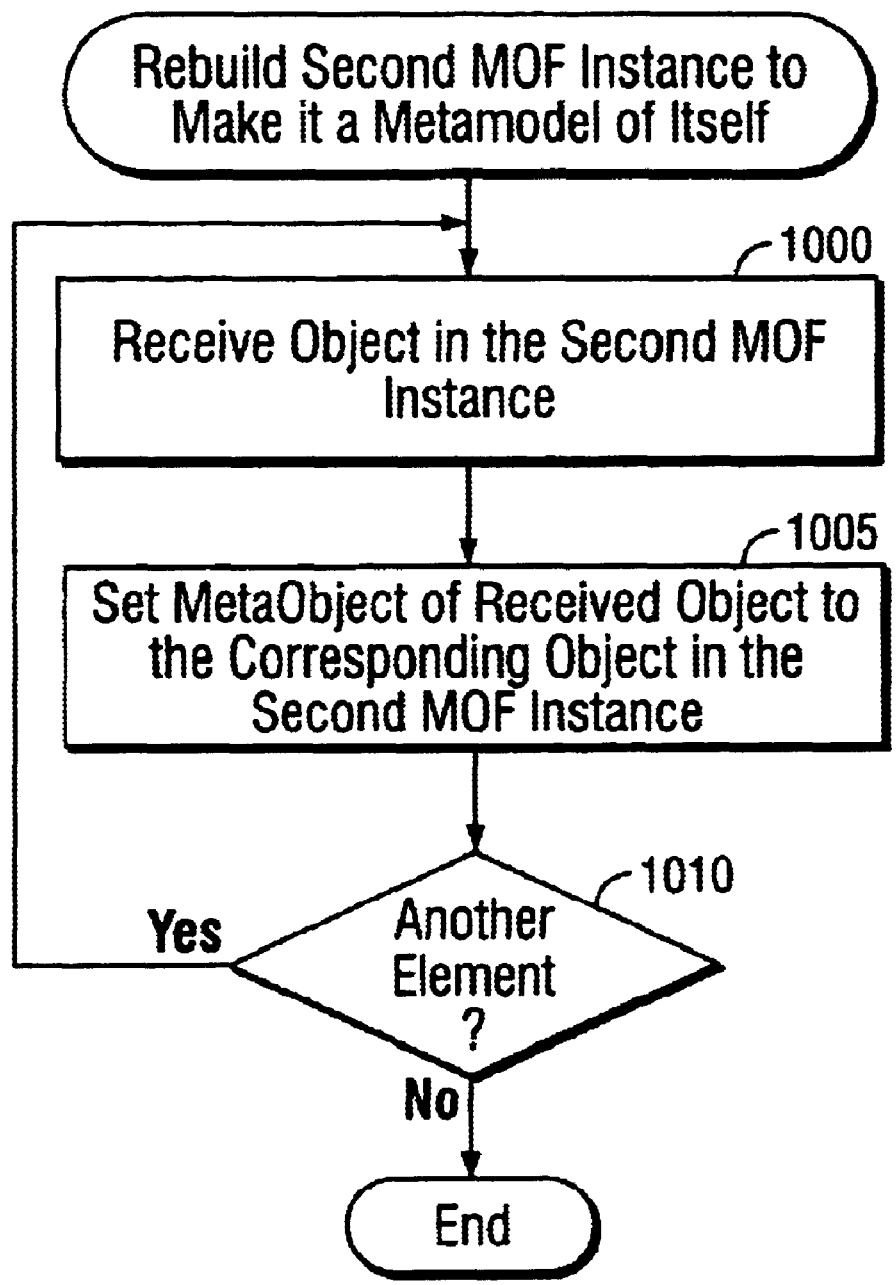
FIG. 10 is a flow diagram that illustrates a method for rebuilding a second MOF instance to make it a metamodel of itself in accordance with one embodiment of the present invention.

Turning now to FIG. 10, a flow diagram that illustrates a method for rebuilding a second MOF instance to make it a metamodel of itself in accordance with one embodiment of the present invention is presented. FIG. 10 provides more detail for reference numeral 620 of FIG. 6. At 1000, an object from the second MOF instance is received. At 1005, the metaobject of the received object is set to the corresponding object in the second MOF instance. At 1010, a determination is made regarding whether another element remains. If another element remains, processing continues at 1000.

Embodiments of the present invention provide a number of important advantages. Less initial coding is required. Also, the amount of re-coding required when the MOF model changes is significantly reduced. The final MOF is also treated the same as any other model, thus simplifying its use.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for loading a model of Meta Object Facility (MOF), the method comprising:

creating a first MOF instance including a model of MOF, said model of MOF being based upon a stored definition of MOF;

rebuilding said first MOF instance to make it a metamodel of itself;

instantiating said first MOF instance to create a second MOF instance, said instantiating including dynamically implementing interfaces;

loading said stored definition of MOF into said second MOF instance; and rebuilding said second MOF instance to make said second MOF instance a metamodel of said second MOF instance.

2. The method of claim 1 wherein said stored definition of MOF comprises an XMI definition of MOF.

3. The method of claim 1, further comprising deleting said first MOF instance after said loading.

4. The method of claim 1 wherein said creating a first MOF instance further comprises:

receiving a stored definition of MOF;

reading said stored definition a first time to create proxies for each MOF class, package and association; and reading said stored definition a second time to read the MOF model into said proxies.

5. The method of claim 1 wherein said rebuilding said first MOF instance further comprises setting the metaobject of at least one object in said first MOF instance to a corresponding object in said first MOF instance.

6. The method of claim 1 wherein said creating a second MOF instance further comprises:

receiving a reference to an element of type "Package";

creating a package proxy corresponding to said referenced package;

receiving an element contained by said referenced package;

creating a class proxy when said element is of type "Class";

creating an association proxy when said element is of type "Association"; and creating proxies for elements contained by a package when said element is of type "Package".

7. The method of claim 1 wherein said rebuilding said second MOF instance further comprises setting the metaobject of at least one object in said second MOF instance to a corresponding object in said second MOF instance.

8. A program storage device readable by a machine, embodying a program of instructions executable by the machine to perform a method to load a model of Meta Object Facility (MOF), the method comprising:

creating a first MOF instance including a model of MOF, said model of MOF being based upon a stored definition of MOF;

rebuilding said first MOF instance to make it a metamodel of itself;

instantiating said first MOF instance to create a second MOF instance, said instantiating including dynamically implementing interfaces;

loading said stored definition of MOF into said second MOF instance; and rebuilding said second MOF instance to make said second MOF instance a metamodel of said second MOF instance.

9. The program storage device of claim 1 wherein said stored definition of MOF comprises an XMI definition of MOF.

10. The program storage device of claim 8, further comprising deleting said first MOF instance after said loading.

11. The program storage device of claim 8 wherein said creating a first MOF instance further comprises:

receiving a stored definition of MOF;

reading said stored definition a first time to create proxies for each MOF class, package and association; and reading said stored definition a second time to read the MOF model into said proxies.

12. The program storage device of claim 8 wherein said rebuilding said first MOF instance further comprises setting the metaobject of at least one object in said first MOF instance to a corresponding object in said first MOF instance.

13. The program storage device of claim 8 wherein said creating a second MOF instance further comprises:

receiving a reference to an element of type "Package";

creating a package proxy corresponding to said referenced package;

receiving an element contained by said referenced package;

creating a class proxy when said element is of type "Class";

creating an association proxy when said element is of type "Association"; and creating proxies for elements contained by a package when said element is of type "Package".

14. The program storage device of claim 8 wherein said rebuilding said second MOF instance further comprises setting the metaobject of at least one object in said second MOF instance to a corresponding object in said second MOF instance.

* * * * *